April 27, 1965 C. U. BALLARD 3,180,464
THROTTLE LOCK AND RELEASE
Filed Aug. 17, 1962
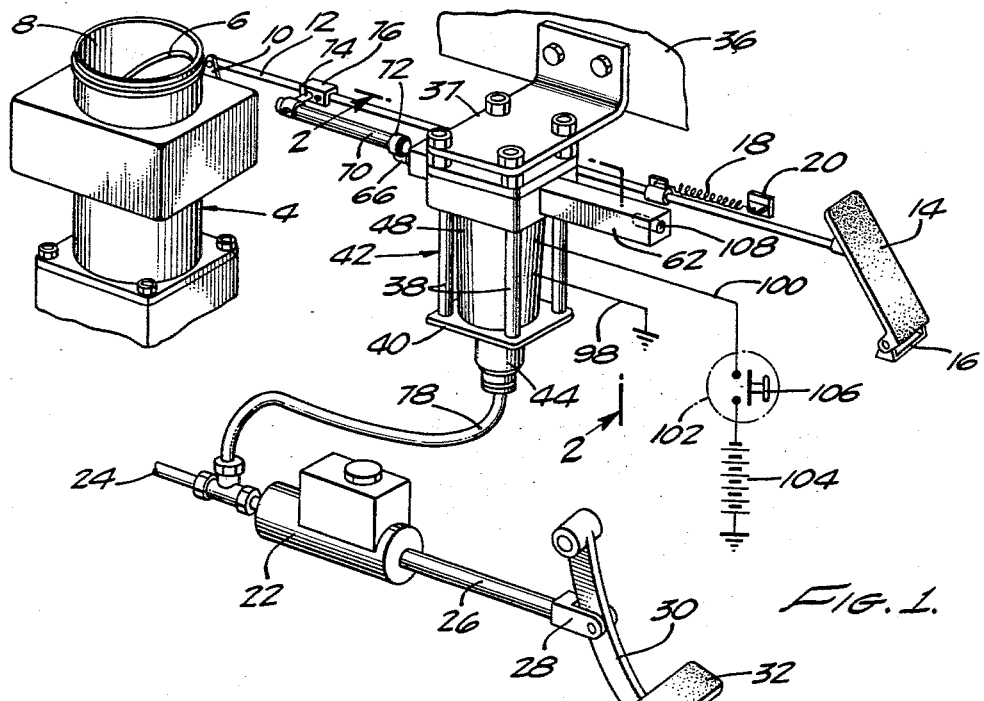
FIG. 1.
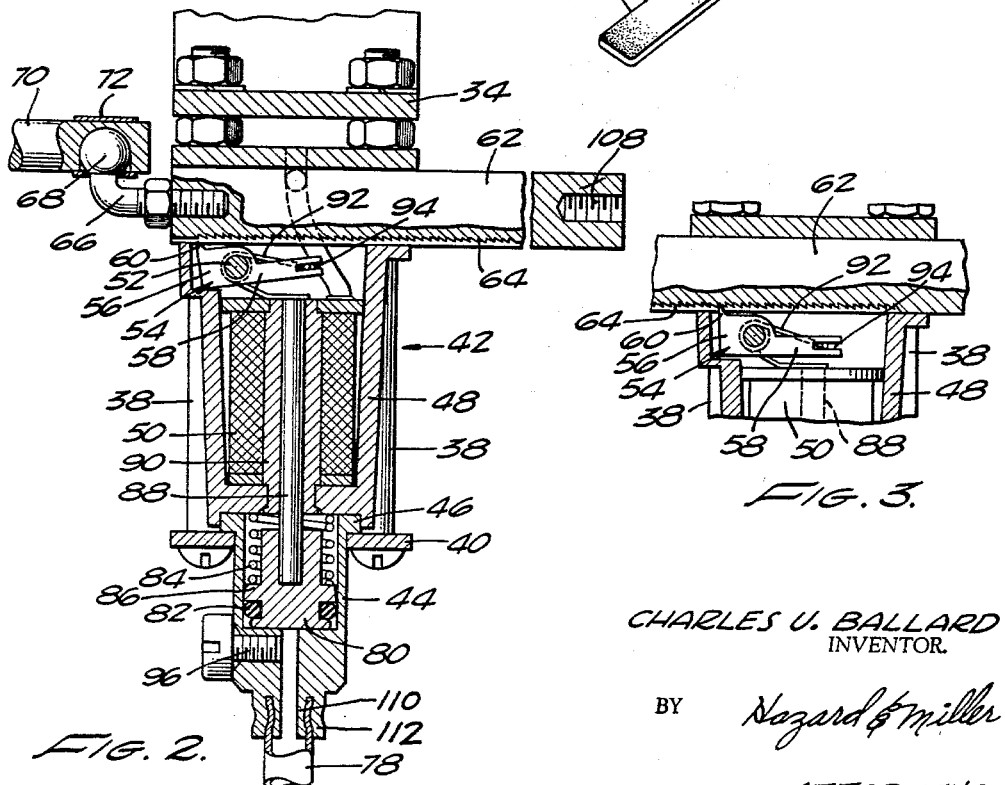
FIG. 2.
FIG. 3.
CHARLES U. BALLARD
INVENTOR.
BY Hazard & Miller
ATTORNEYS United States Patent Office 3,180,464
Patented Apr. 27, 1965

3,180,464
THROTTLE LOCK AND RELEASE
Charles U. Ballard, 4253 W. Lennox Blvd.,
Inglewood, Calif.
Filed Aug. 17, 1962, Ser. No. 217,759
1 Claim. (Cl. 192—3)

This invention relates to a throttle lock and release for motor vehicles and more particularly to one wherein the vehicle is provided with an internal combustion engine having a fuel supply system and throttle pedal therefor and a hydraulic braking system.

One of the objects of the invention is to provide a throttle lock and release which when the throttle pedal is depressed to increase the speed of the engine and of the vehicle, the throttle will be locked in the position to which it is moved by the pedal and wherein the throttle can be released from its locked position either by additional throttle pedal pressure, or pressure on the conventional foot brake pedal of the hydraulic braking system of the vehicle.

Another object is to provide an improved throttle lock and release wherein the throttle can be locked to a desired speed and released either by pressure upon the throttle pedal or the brake pedal, and will remain released until deliberately reset by the operator of the vehicle.

A further object of the invention is to provide a throttle lock including a lockable member movable with the conventional throttle actuating mechanism and a locking member wherein the locking member is biased to a released position and will engage the lockable member upon positive and deliberate action by the operator of the vehicle.

Another object of the invention is to provide a throttle lock and release which can be mounted easily and readily upon a motor vehicle and quickly and simply connected to the throttle actuating mechanism and the brake system of the vehicle.

The above and other objects will more fully appear from the following description in connection with the accompanying drawing:

FIG. 1 is a perspective view of an embodiment of the invention together with an engine carburetor and foot throttle control and the master cylinder and foot pedal of a hydraulic braking system;

FIG. 2 is an enlarged vertical sectional view taken approximately on the line 2—2 of FIG. 1;

FIG. 3 is a fragmentary view of a portion of the mechanism as viewed in FIG. 2 with the throttle lock in its opposite or locked position.

There is illustrated generally an internal combustion engine carburetor 4 having a throttle valve 6 in its intake passage 8. A throttle lever 10 is suitably connected to the throttle valve 6 in a conventional manner, and lever 10 is connected by a rod 12 to a throttle pedal 14, the latter being pivotally supported on a suitable bracket 16 on the floorboard of the vehicle in the usual manner. A tension spring 18 is connected between the throttle operating rod 12 and a bracket 20 which may be mounted on any suitable stationary support, such as a portion of the engine, to bias the throttle 6 toward the idling position of the engine. This of course will likewise bias the foot pedal 14 upwardly to its position of rest when no foot pressure is applied to it.

In the lower portion of FIG. 1 there is shown a conventional master cylinder 22 of a motor vehicle hydraulic brake system. A conduit 24 leads from the outlet of the cylinder to the brakes of the vehicle. A piston rod 26, whose piston (not shown) is moved to create pressure in the master cylinder 22, is connected by a clevis 28 to a foot brake lever 30 having a conventional pedal 32.

A bracket 34 has one portion thereof connected to a portion 36 of the internal combustion engine, or said bracket may be conveniently supported on any relatively stationary portion of the vehicle adjacent the throttle operating rod 12. In the particular embodiment shown, the bracket 34 extends over the rod 12. Suspended from the bracket 34 by bolts 38 is the bottom plate 40 of my throttle lock control unit, indicated generally at 42. The bottom plate 40, as shown in FIG. 2, has a relatively small flat cylinder 44 extending upwardly therethrough and supported by a flange 46 which rests on the face of said bottom plate 40. Resting upon the upper flanged portion 46 of the cylinder 44 is a housing 48 which encloses an electromagnetic coil 50. In the upper portion of the housing 48 there is a transverse pin 52 which pivotally supports a locking member in the form of a dog 54. On the upper corner of the left side 56 of said dog is a tooth 60 which is adapted to engage any one of a number of points along a locking zone on a lockable member 62, the locking zone being defined by a series of teeth or serrations 64.

The lockable member 62 is shown in the form of an elongated squared bar which is slidable through opposed apertures in the upper portion of the housing 48. Said lockable member or bar 62 has threaded into its left end a bolt 66 having an offset ball 68 on the end thereof. The ball 68 is seated in the socketed end of a connecting link 70 and retained therein by a keeper clip 72. The opposite end of the link 70, as shown in FIG. 1, is connected by a pin 74 to a block 76 suitably secured on the throttle operating rod 12. The connection of the pin 74 with the link 70 is by a ball and socket arrangement similar to the ball arrangement 68.

The cylinder 44 is shown connected at its bottom by means of a conduit 78 with the conduit 24 which leads from the master brake cylinder 22. Within the cylinder 44 is a piston 80 having an O-ring packing 82 and normally urged downwardly by a compression spring 84 interposed between a shoulder 86 on the piston and the underside of the housing 48, which encloses the electromagnetic coil 50. Seated in a suitable bore in the upper portion of the piston 80 is a dog releasing rod 88 which extends upwardly through a guide sleeve 90 in the center of the coil 50. The upper end of the rod 88, when elevated by the piston 80, will engage the underside of the pivoted dog portion 58 to swing the dog in a counterclockwise direction. Said dog is biased to the position shown in FIG. 2 wherein the dog tooth 60 is out of engagement with the rack 64. This is accomplished by means of a spring 92 having one arm bearing against the upper end of the electromagnetic coil unit 50 and the other end fitted in a slot 94 in the right arm 58 of the pivoted dog 54. An intermediate portion of the spring 92 is wrapped around the dog pivot pin 52 and the resiliency of the spring is such that its two arms are urged apart.

In the lower portion of the cylinder 44 is a threaded stud 96 which serves as a bleeder in the fluid line leading from the hydraulic brake conduit 24 to the piston 44.

The electromagnetic coil 50, as diagrammatically indicated in FIG. 1, has one side provided with a ground connection 98 and the other side connected by wire 100 to one side of a switch unit 102, the other side being connected to the vehicle battery 104. The switch is provided with a circuit closing button 106 which may be mounted conveniently on or adjacent the door of the vehicle at the driver's side, on the upper end of the steering post or at some other suitable location for the convenience of the driver, and the switch is so constructed that the circuit from the battery through the coil 50 is maintained only so long as the switch button 106 is depressed.

In operation, until the coil 50 is energized by closing of the switch 106, the locking member or dog 54 will remain in the position shown in FIG. 2. Thus, the operator of the vehicle can start the engine and drive the vehicle in the usual manner and the throttle lock will remain inoperative or in the released position of FIG. 2. However, when the driver wishes to lock the throttle to maintain it at a fixed open or partially open position, he merely presses the switch button 106 while his foot holds the throttle pedal 14 at the position at which the desired speed of the vehicle has been attained. As soon as the coil 50 is energized it will produce an electromagnetic attraction on the right arm 58 of the pivot dog or locking member 54 and partially rotate the locking member in a clockwise direction, pulling the arm 58 down and elevating the tooth 60 of the locking member or dog so that it will engage between two of the teeth 64 on the reciprocating lockable member or bar 62. The operator releases foot pressure on the throttle pedal 14 while the switch button 106 is depressed so that the action of the throttle spring 18 will cause one of the teeth 64 to press against the tooth 60 on the dog 54 and hold the locking member and lockable member in engagement. Obviously, the tension of the spring 18 on the throttle operating rod 12 is sufficiently great to overcome the strength of the spring 92 on the dog 54. In actual practice the strength of the throttle spring 18 is sufficiently greater than the forces of the spring 92 just mentioned to maintain the dog tooth 60 in engagement with the teeth 64 on the lockable member 62 so that those teeth will remain in engagement even though the vehicle is subjected to considerable road shock and vibration.

Even though the dog 54 and toothed bar 62 are firmly locked together by said dog, the latter can be released quickly and easily from the lockable member 62 by very slight pressure on the throttle pedal 14. Such movement of the throttle pedal will move the throttle operating rod 12, connecting link 70 and lockable member 62 a slight distance to the left as viewed in FIGS. 1 and 2, and release pressure of the particular tooth 64 from the dog tooth 60, thereby permitting the dog 54 to move in a counterclockwise direction and dropping said tooth 60 out of engagement with the particular one of the teeth 64 with which it has been engaged.

The dog 54 can also be released by slight pressure upon the hydraulic brake pedal 32. This will create pressure in the master cylinder 22 and in the conduit 78, forcing the piston 80 and the rod 88 upwardly to engage the underside of the right arm 58 of the pivoted dog 54 and forcing the dog tooth 60 out of engagement with the particular tooth 64 on the lockable member 62.

When the dog 54 is disengaged by pressure either upon the throttle pedal 14 or the brake pedal 32, the throttle cannot again be locked in a fixed position until the operator presses the switch button 106 to again energize the electromagnetic coil 50 and swing the dog again in a clockwise direction.

It will be noted that the reciprocating bar or lockable member 62, with its teeth 64, is provided with a threaded socket 108. In the illustrated embodiment the throttle 6 is opened by pressure on the foot pedal 14 which moves the throttle rod 12 to the left as viewed in FIG. 1. In some motor vehicles pressure on the foot pedal will move the operating rod 12 in the opposite direction to open the throttle. In such a case the housing 48 and the toothed bar or lockable member 62 are turned 180 degrees about the vertical axis of the housing and the threaded socket 108 positioned to receive the bolt 66 with its ball end 68.

It should be noted that should the hydraulic brake conduit or the conduit 78 to the piston 44 break and lose pressure, the throttle lock can be released merely by pressure upon the throttle pedal 14. Also, should the throttle operating rod 12 become disengaged from the throttle pedal 14, a slight pressure on the brake pedal 32 will disengage the throttle lock. Of course if the linkage 70 between the throttle lock and the throttle operating rod 12 become disengaged, the lock would have no effect upon the normal operation of the throttle.

It should also be noted that the locking member or dog 54 will not accidentally be jarred or jolted from its unlocked position of FIG. 2 into engagement with the teeth 64 on the lockable member 62. With the dog 54 held in its unlocked position, the spring 92 is of sufficient strength to maintain the dog in its unlocked position until it is intentionally moved to the locked position by energization of the coil 50.

Another feature of the structure is that the locking mechanism which carries the locking member or dog 54 and the lockable member or toothed bar 62 and the carburetor 4 with its throttle 6 are both mounted on the internal combustion engine so that the throttle locking unit and the throttle move together with the engine in any movement thereof. The connection between the throttle operating rod 12 and the throttle pedal 14 is conventionally one which permits relative movement between the throttle pedal and the engine, and the hose 78 between the brake conduit 24 and the cylinder 44 is flexible.

The cylinder 44 is connected to the pressure fluid conduit 78 without the use of a conventional screw coupling. The outer end of cylinder 44 is provided with a pair of concentric flanges 110 and 112. The end of the conduit 78 is positioned between the flanges and the outer flange 112 rolled or pressed inwardly to grip the end of said conduit 78. This connection need not be made until the entire device is installed and consequently the cylinder 44 can be rotated to a desired position wherein the bleeder 96 is upright when the control unit 42 is placed in a horizontal position as is required with some makes of motor vehicles. With ordinary screw threaded couplings, it is usually difficult if not impossible to tighten them so that the bleeder will be in an uppermost position, but it can be done very simply with the structure shown.

It will of course be understood that various changes can be made in the form, details, arrangement and proportions of the various parts without departing from the spirit of the invention.

I claim:

A throttle lock and release for a motor vehicle having an internal combustion engine, a fuel supply device, a fluid pressure braking system and a throttle control system including a foot pedal having a movable operating connection with the fuel supply device including means for biasing said system to an engine idling position, comprising a lockable member having means for connection with said throttle control system and movable therewith toward and from said idling position, a locking member supported independently of said lockable member and movable into and out of engagement with the lockable member, momentarily effective means for moving said locking member into engagement with said lockable member to block movement of the lockable member and the throttle control system to an idling position, said lockable member and said locking member having cooperating portions held in mutual movement blocking relationship by the bias of said throttle system biasing means, spring means connected to said locking member biasing it out of engagement with said lockable member, said cooperating portions being releasable by pressure on said foot pedal in opposition to said throttle system biasing means, and a locking member release having means for fluid pressure connection with said braking system and having a portion thereof positioned adjacent said locking member to release the locking member from the lockable member upon brake application.

References Cited by the Examiner
UNITED STATES PATENTS 2,284,380 5/42 Drabble.
2,467,485 4/49 Krieg.
2,487,606 11/49 Smith.

FOREIGN PATENTS 706,420 3/31 France.

DAVID J. WILLIAMOWSKY, *Primary Examiner.*